United States Patent
Saito et al.

(10) Patent No.: US 11,239,920 B2
(45) Date of Patent: Feb. 1, 2022

(54) DIAGNOSTIC MODULE, MONITORING METHOD, AND STORAGE MEDIUM

(71) Applicant: Hitachi, Ltd., Tokyo (JP)

(72) Inventors: Yuta Saito, Tokyo (JP); Shinichi Kasahara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/184,314

(22) Filed: Feb. 24, 2021

(65) Prior Publication Data

US 2021/0376930 A1 Dec. 2, 2021

(30) Foreign Application Priority Data

May 27, 2020 (JP) .............................. JP2020-092315

(51) Int. Cl.
*H04B 10/40* (2013.01)
*H04B 10/516* (2013.01)
*H04B 10/079* (2013.01)

(52) U.S. Cl.
CPC ......... *H04B 10/40* (2013.01); *H04B 10/0799* (2013.01); *H04B 10/5165* (2013.01)

(58) Field of Classification Search
None
See application file for complete search history.

(56) References Cited

U.S. PATENT DOCUMENTS

| | | | | |
|---|---|---|---|---|
| 6,339,495 B1* | 1/2002 | Cowle | ................. | H04B 10/296 |
| | | | | 359/337.1 |
| 2002/0048062 A1* | 4/2002 | Sakamoto | ......... | H04B 10/2569 |
| | | | | 398/30 |
| 2005/0225840 A1* | 10/2005 | Drasek | ................. | G01N 21/39 |
| | | | | 359/333 |
| 2006/0203329 A1* | 9/2006 | Nishihara | ......... | H04B 10/2942 |
| | | | | 359/337 |
| 2008/0232804 A1* | 9/2008 | Absillis | ..................... | H04J 3/14 |
| | | | | 398/71 |
| 2009/0110399 A1* | 4/2009 | Aihara | ................. | G06F 11/201 |
| | | | | 398/66 |
| 2018/0063676 A1* | 3/2018 | Mycek | ...................... | G01S 5/02 |
| 2019/0147202 A1* | 5/2019 | Harney | ................... | H04W 4/80 |
| | | | | 235/375 |
| 2019/0148904 A1* | 5/2019 | Tanaka | ................. | H01S 3/0085 |
| | | | | 359/341.3 |

* cited by examiner

*Primary Examiner* — Darren E Wolf
(74) *Attorney, Agent, or Firm* — Procopio, Cory, Hargreaves & Savitch LLP

(57) ABSTRACT

A microcomputer 202 is coupled to a SFP module 101 via control signal lines 112 to 114. The microcomputer 202 monitors control signals transmitted on the control signal lines 112 to 114, and acquires, based on the result of monitoring, the condition of the SFP module 101 from a ROM 151 at a timing when a protocol chip 102 is not accessing the SFP module 101.

20 Claims, 8 Drawing Sheets

FIG. 4

| Chip name | ID | Status read interval $\Delta Ts$ |
|---|---|---|
| XXXX-A | 0x01 | 100ms |
| YYYY-C | 0x02 | 300ms |
| ZZZZ-G | 0x03 | 500ms |
| : | : | : |

400 Management table

DIAGNOSTIC MODULE, MONITORING METHOD, AND STORAGE MEDIUM

CROSS-REFERENCE TO PRIOR APPLICATION

This application relates to and claim the benefit of priority from Japanese Patent Application No. 2020-92315 filed on May 27, 2020 the entire disclosure of which is incorporated herein by reference.

BACKGROUND

The present disclosure relates to a diagnostic module, a monitoring method, and a storage media.

For an optical communication apparatus equipped with an optical transmitter and receiver such as an SFP (Small Form-factor Pluggable) module compatible with the SFP standard, a general-purpose chip is often used as a protocol chip for performing I/O processing in accordance with a communication protocol such as Fibre Channel and Ethernet.

SUMMARY

In the above optical communication apparatus, the optical output of the optical transmitter and receiver may decrease due to an initial failure of the optical transmitter and receiver, resulting in unstable optical connection. Therefore, it is necessary to acquire condition information of the optical transmitter and receiver from the optical transmitter and receiver.

Some protocol chips provided in optical communication apparatuses have a function to acquire the condition information of the optical transmitter and receiver, while many general-purpose protocol chips are for single-tasking and may each temporarily stop I/O function, which is the original function of the protocol chip, to acquire the condition information of the optical transmitter and receiver. Stopping the I/O function of the protocol chip may have an unacceptable influence on the equipment using the optical communication apparatus.

An object of the present disclosure is to provide a diagnostic apparatus, a diagnostic method, and a storage medium that are capable of acquiring condition information of an optical transmitter and receiver while suppressing the influence on the I/O function.

A diagnostic module according to one aspect of the present disclosure is for diagnosing a communication module that includes an optical transmitter and receiver including a memory that stores condition information indicating its own condition and configured to perform optical communication, and a protocol chip coupled to the optical transmitter and receiver via control signal lines to control the optical communication by the optical transmitter and receiver. The diagnostic module includes a management unit coupled to the optical transmitter and receiver via the control signal lines, the management unit being configured to monitor control signals transmitted on the control signal lines, and acquiring, based on a result of monitoring, the condition information from the memory of the optical transmitter and receiver at a timing when the protocol chip is not accessing the memory of the optical transmitter and receiver.

According to the present invention, it is possible to acquire the condition information of the optical transmitter and receiver while suppressing the influence on the I/O function.

BRIEF DESCRIPTION OF THE DRAWINGS

FIG. 4 illustrates an example of a management table;

DETAILED DESCRIPTION OF THE EMBODIMENT

Embodiments of the present disclosure will be described below with reference to the drawings.

Figure 1:
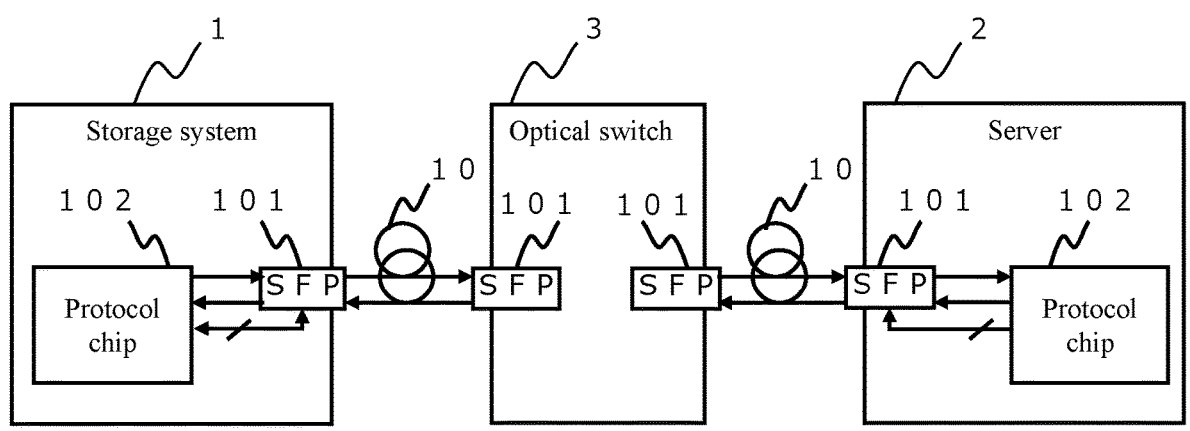
FIG. 1 is a diagram illustrating a communication system according to an embodiment of the present disclosure.

FIG. 1 is a diagram illustrating a communication system according to an embodiment of the present disclosure. The communication system illustrated in FIG. 1 includes a storage system 1, a server 2, and an optical switch 3.

The storage system 1 is a storage apparatus that stores data. The server 2 is a host apparatus that controls data read from and data write to the storage system 1. The storage system 1 and the server 2 are coupled to each other via an optical transmission line 10 so as to be able to communicate with each other by optical communication. In the example of FIG. 1, one optical switch 3 that relays optical communication is provided between the storage system 1 and the server 2. Note that a plurality of optical switches 3 may be provided between the storage system 1 and the server 2, or no optical switches 3 may be provided.

The storage system 1 and the server 2 each include an SFP module (simply referred to as SFP throughout the drawings) 101, which is an optical transmitter and receiver that performs optical communication (transmission and reception of optical signals), and a protocol chip 102 that controls the optical communication performed by the SFP module 101. The optical switch 3 includes an SFP module 101 for the storage system 1 and an SFP module 101 for the server 2.

Figure 2:
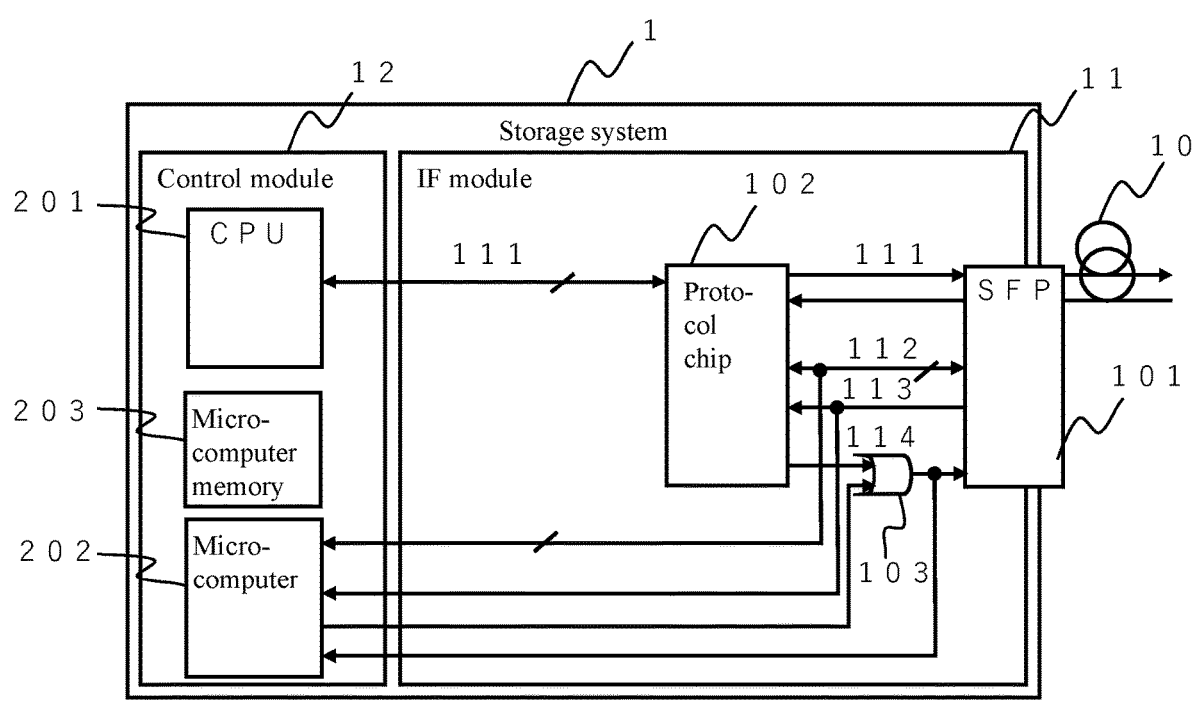
FIG. 2 is a diagram illustrating a module configuration of a storage system.
Figure 3:
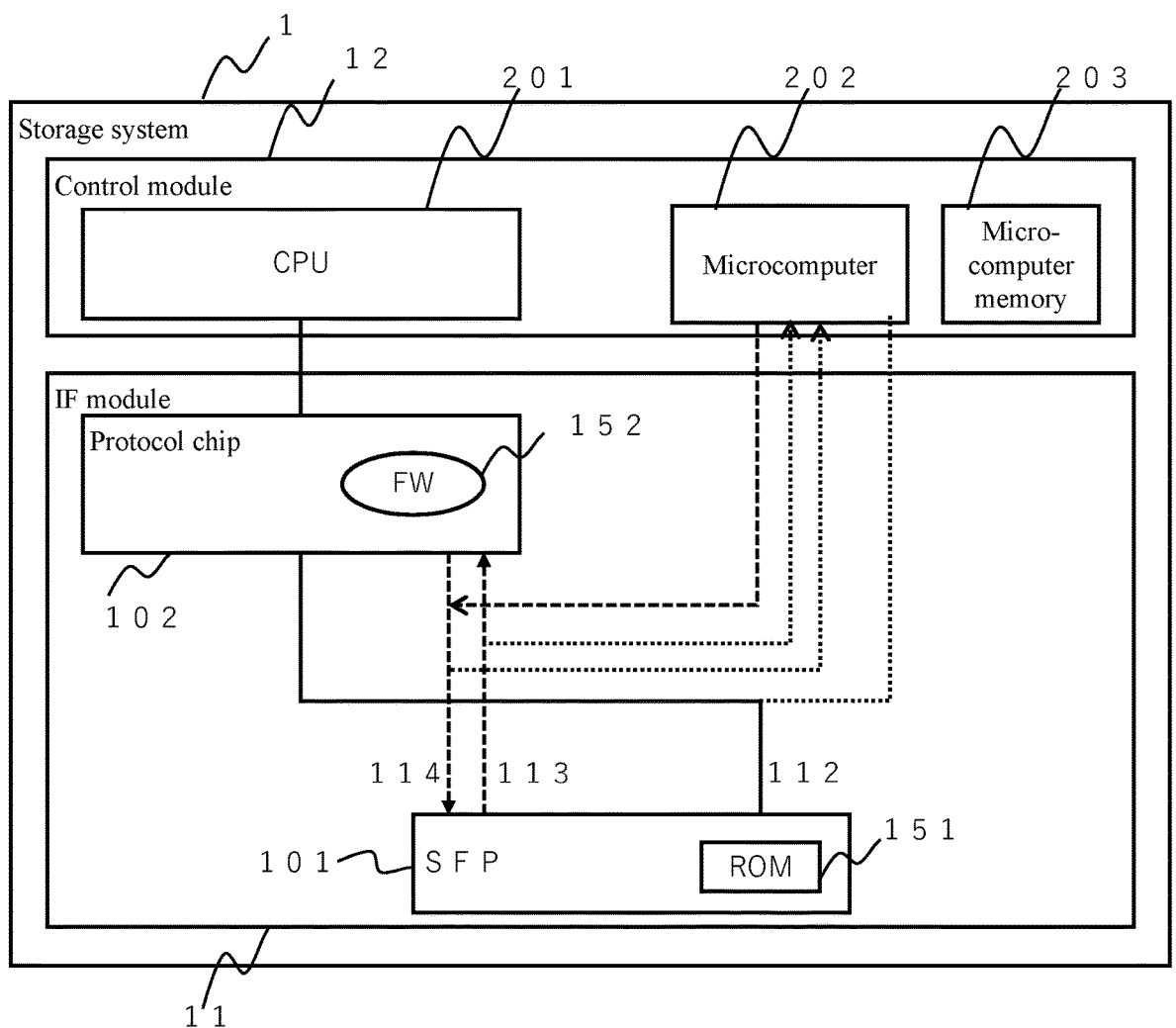
FIG. 3 is a diagram illustrating a functional configuration of the storage system.

FIG. 2 is a diagram illustrating a module configuration of the storage system 1, and FIG. 3 is a diagram illustrating a functional configuration of the storage system 1.

As illustrated in FIGS. 2 and 3, the storage system 1 includes an IF (Interface) module 11 and a control module 12. The IF module 11 is a communication module that performs optical communication with an external apparatus (server 2 in the present embodiment). In the present embodiment, the IF module 11 performs optical communication in accordance with the SFP standard.

The IF module 11 includes the SFP module 101 and the protocol chip 102. The SFP module 101 and the protocol chip 102 are coupled to each other via a high-speed transmission wiring (H-speed transmission wiring) 111, an I2C (Inter-Integrated Circuit) signal line 112, a PD (Presence Detect) signal line 113, and a TxDis (Tx Disable) signal line 114. Further, an OR circuit 103 is provided on a TxDis signal line 114. Note that in FIG. 3, the OR circuit 103 and the high-speed transmission wiring 111 are not illustrated.

The high-speed transmission wiring 111 is wiring for inputting and outputting data transmitted to and received from the server 2 through optical communication. The I2C signal line 112, the PD signal line 113, and the TxDis signal line 114 are control signal lines for transmitting a control signal for controlling the SFP module 101.

The I2C signal line 112 is a signal line for supporting the I2C system, which is a communication standard for serial buses, and is used for transmitting various requests to the SFP module 101 and response information to the requests.

The PD signal line 113 is a signal line for transmitting a PD signal which is a sideband signal of the SFP module 101. The PD signal is a signal fixed to a logic Low level by the SFP module 101, and the PD signal is a logic High level in a case where there is provided no SFP module 101 (in a case where no SFP module 101 is attached to the IF module 11).

The TxDis signal line 114 is a signal line for transmitting a TxDis signal which is a sideband signal of the SFP module 101. The TxDis signal is a switching signal for switching the optical output of the SFP module 101 on and off, and when the switching signal is a logic High level, the SFP module 101 stops the optical output. In the present embodiment, there are types of TxDis signals: a first TxDis signal output from the protocol chip 102 and a second TxDis signal output from a microcomputer 202 (described below) of the control module 12, and the optical output of the SFP module 101 is controlled by a logical operation of the first TxDis signal and the second TxDis signal (see FIGS. 8(a) and 8(b)).

The SFP module 101 includes a ROM (Read Only Memory) 151 as illustrated in FIG. 3. The ROM 151 is a memory that stores SFP information related to the SFP module 101. The SFP information includes device information fixed to the SFP module 101 and condition information which is real-time information changed according to the situation. The device information includes, for example, the device name of the SFP module 101. The condition information is information indicative of the condition of the SFP module 101, and includes, for example, the temperature of the SFP module 101, the transmission and reception levels to and from an external apparatus (transmission laser power and/or reception laser power), the status of the SFP module 101, and the like. The status indicates "abnormal" or "normal". Note that the condition information is updated in the ROM 151 by, for example, the SFP module 101 itself.

The protocol chip 102 executes I/O processing for data via the SFP module 101. The I/O processing includes, for example, protocol conversion processing of performing mutual conversion between a protocol for optical communication such as Fiber Channel and a protocol for telecommunications such as Ethernet. Most of the functions of the protocol chip 102 are implemented by hardware, but some functions such as queue distribution are implemented by an FW (Firmware) 152 illustrated in FIG. 3. In a case where a general-purpose chip is used as the protocol chip 102, the FW 152 is often for single-tasking.

The control module 12 is a control unit that controls the IF module 11 and functions as a diagnostic module for diagnosing the IF module 11. The control module 12 includes a CPU 201, the microcomputer 202, and a microcomputer memory 203. The CPU 201 and the microcomputer 202 implement various functions described below by reading a program from a storage medium and executing the program. The storage medium may be the microcomputer memory 203, or may be another storage medium (not illustrated).

The CPU 201 is coupled to the IF module 11 via the high-speed transmission wiring 111, and performs processing related to data transmitted and received by the IF module 11. For example, the CPU 201 writes data received from the server 2 by the IF module 11 to a storage apparatus (not illustrated), reads the data from the storage apparatus, and transmits the data to the server 2 via the IF module 11.

The microcomputer 202 is a management unit for managing the IF module 11, and is a diagnostic microcomputer for diagnosing the IF module 11. The microcomputer 202 is coupled to the IF module 11 via the I2C signal line 112, the PD signal line 113, and the TxDis signal line 114, which are control signal lines.

Further, the microcomputer 202 monitors control signals (specifically, the PD signal and the TxDis signal which are sideband signals) transmitted on the control signal lines, and acquires (captures) SFP information from the ROM 151 based on the result of monitoring at a timing when the protocol chip 102 is not accessing the SFP module 101 via the I2C signal line 112.

Specifically, the microcomputer 202 periodically executes check processing of checking the sideband signals (PD signal and TxDis signal) twice at predetermined time intervals. In the check processing, when the state (values) of the sideband signals checked the first time is the same as the state checked the second time, the microcomputer 202 determines that the protocol chip 102 is not accessing the SFP module 101 (more specifically, ROM 151), and then acquires the SFP information from the ROM 151. This is because most of the processing in which the protocol chip 102 accesses the SFP module 101 is executed when the states of the sideband signals change. For example, most of the processing in which the protocol chip 102 accesses the SFP module 101 is normally executed before the TxDis signal is asserted. Further, when the SFP module 101 is attached or detached (i.e., when the state of the PD signal changes), the processing in which the protocol chip 102 accesses the SFP module 101 is intensively executed.

A status read interval $\Delta Ts$, which is a time interval for acquiring the SFP information in the microcomputer 202, may be, for example, a fixed value or may be set according to the type of the protocol chip 102. The type of the protocol chip 102 may be acquired from the protocol chip 102 or may be input from an administrator, for example.

FIG. 4 illustrates an example of a management table illustrating a relationship between the type of the protocol chip 102 and the status read interval $\Delta Ts$. A management table 400 illustrated in FIG. 4 includes fields 401 to 403. The field 401 stores a chip name, which is the name of the protocol chip 102. The field 402 stores an ID which is identification information for identifying the type of the protocol chip 102. The field 403 stores a status read interval $\Delta Ts$. The management table 400 is stored in advance in, for example, a storage area that is readable by the microcomputer 202 of the IF module 11. Further, the management table 400 may be stored in the microcomputer memory 203 or the like.

Figure 5:
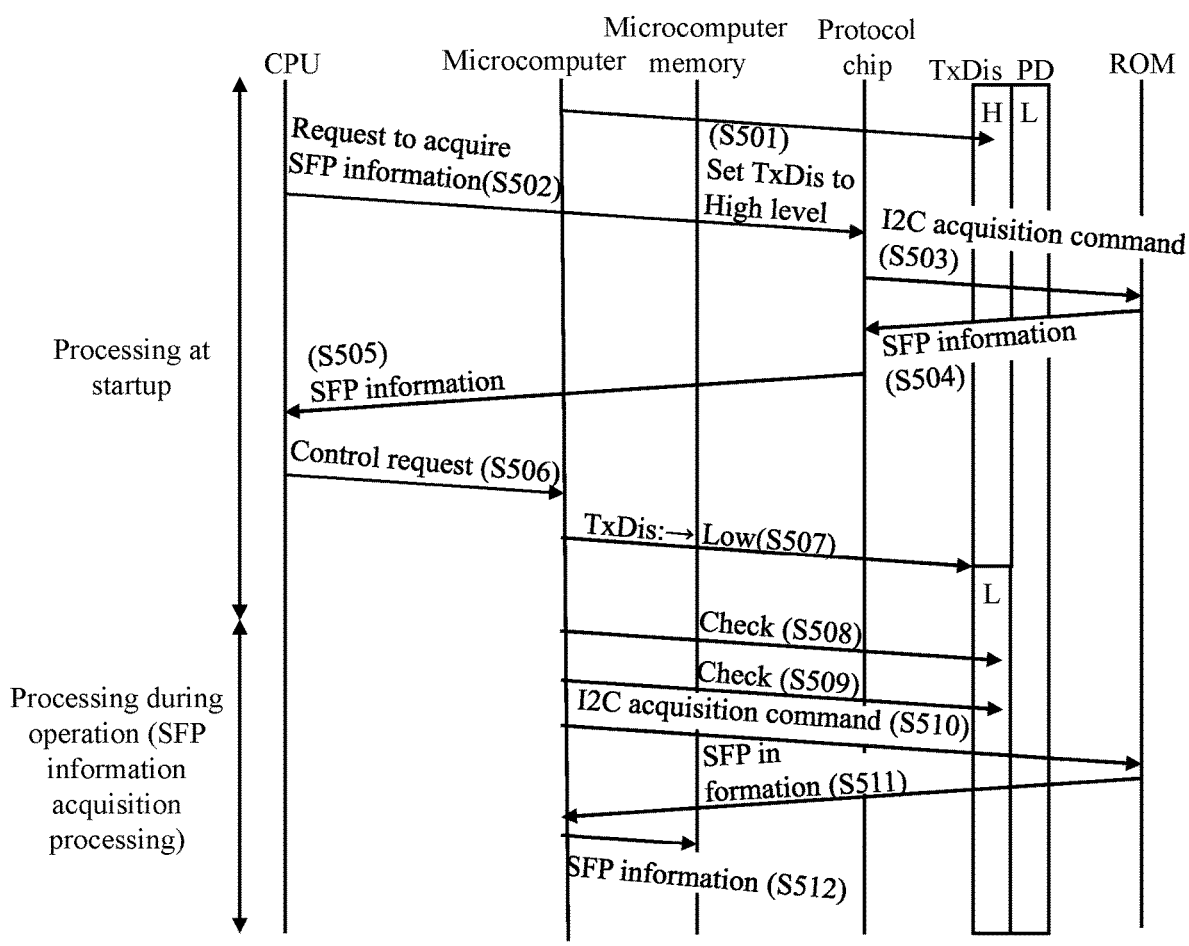
FIG. 5 is a sequence diagram for explaining an operation of the storage system.

FIG. 5 is a sequence diagram for explaining an operation of the storage system 1.

First, when the storage system 1 is started, the microcomputer 202 fixes the TxDis signal at a logic High level (step S501). Accordingly, the storage system 1 is started in a state where the optical output of the SFP module 101 is stopped. Note that the SFP module 101 is already inserted into the IF module 11 at the time of startup, and therefore the PD signal is fixed at a logic Low level.

Subsequently, the CPU 201 transmits a request for acquiring the SFP information to the protocol chip 102 (step S502). The request for acquiring the SFP information requests the processing in which the protocol chip 102 accesses the ROM 151 of the SFP module 101.

In response to receiving the request for acquiring the SFP information, the protocol chip 102 issues an I2C acquisition command, which is an SFP information acquisition command for the I2C system, to the SFP module 101 via the I2C signal line 112 (step S503). In response to receiving the I2C acquisition command, the SFP module 101 reads the SFP information from the ROM 151 and transmits the SFP information to the protocol chip 102 (step S504).

In response to receiving the SFP information, the protocol chip 102 transmits the SFP information to the CPU 201 (step S505). The CPU 201 performs initial settings for the SFP module 101 based on the SFP information, and then transmits a control request for requesting the start of optical communication by the SFP module 101 to the microcomputer 202 (step S506).

In response to receiving the control request, the microcomputer 202 changes the TxDis signal to a logic Low level (step S507). Accordingly, optical communication is started by the SFP module 101.

After that, the microcomputer 202 periodically performs the SFP information acquisition processing (steps S508 to S512).

In the SFP information acquisition processing, the microcomputer 202 checks the TxDis signal and the PD signal, which are sideband signals, twice at a predetermined status read interval ΔTs (steps S508 and S509). When the states of the sideband signals are the same, the microcomputer 202 issues the I2C acquisition command to the SFP module 101 via the I2C signal line 112 (step S510). In response to receiving the I2C acquisition command, the SFP module 101 reads the SFP information from the ROM 151 and transmits the SFP information to the microcomputer 202 (step S511). In response to receiving the SFP information, the microcomputer 202 stores the SFP information in the microcomputer memory 203 (step S512). Note that the SFP information stored in the microcomputer memory 203 is used for the diagnosis of the SFP module 101. The diagnosis of the SFP module 101 is performed by, for example, the microcomputer 202.

Figure 6:
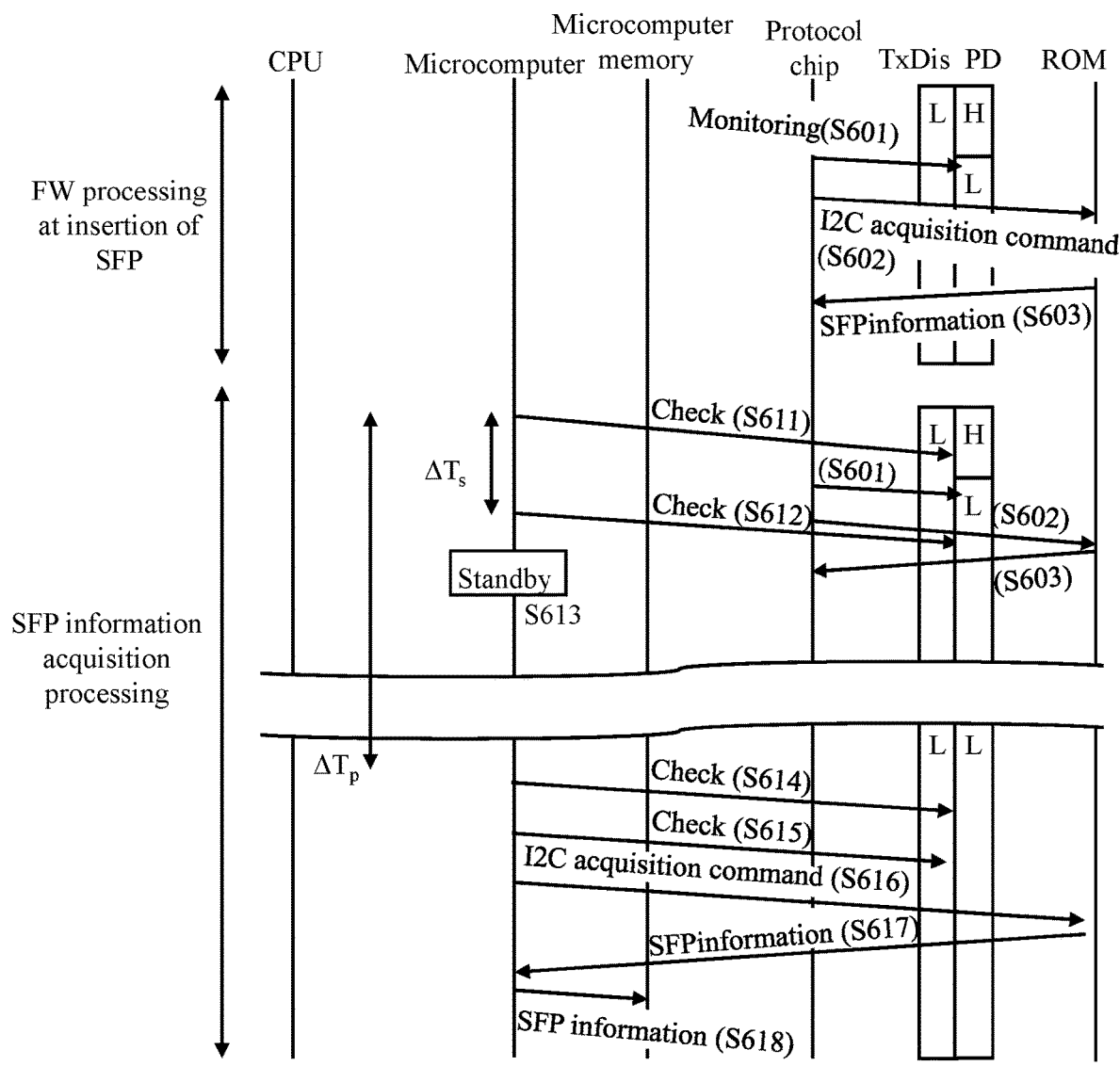
FIG. 6 is a sequence diagram for explaining SFP information acquisition processing in more detail.

FIG. 6 is a sequence diagram for explaining the SFP information acquisition processing in more detail.

First, prior to explaining the SFP information acquisition processing, FW processing will be described that is processing performed by the FW 152 of the protocol chip 102 at the insertion of the SFP module 101 into the IF module 11. Note that in the following description, the FW 152 will be described as primarily performing the operation, but the actual component for primarily performing the operation is a processor (not illustrated) provided on the protocol chip 102 to execute the FW 152.

In the FW processing, the FW 152 monitors the PD signal (step S601), determines that the SFP module 101 has been inserted when the PD signal is turned to a logic Low level, and issues the I2C acquisition command to the SFP module 101 via the I2C signal line 112 (step S602). In response to receiving the I2C acquisition command, the SFP module 101 reads the SFP information from the ROM 151 and transmits the SFP information to the protocol chip 102 (step S603).

Next, the SFP information acquisition processing will be described.

In the SFP information acquisition processing, the microcomputer 202 identifies the status read interval ΔTs based on the management table 400, and checks the TxDis signal and the PD signal, which are sideband signals (step S611). Then, the microcomputer 202 checks the TxDis signal and the PD signal again after the status read interval ΔTs (step S612). Here, it is assumed that the SFP module 101 has been inserted into the IF module 11 in the time between the two checks, and thus the PD signal has been turned to a logic Low level from a logic High level. In this case, the microcomputer 202 determines that the protocol chip 102 is accessing the ROM 151, and stands by without acquiring the SFP information from the ROM 151 (step S613). In the example of FIG. 6, the FW 152 of the protocol chip 102 executes the FW processing (S601 to S603) in the time between the two checks.

When a predetermined polling interval ΔTp elapses from the start of the processing in step S611, the microcomputer 202 checks the TxDis signal and the PD signal, which are sideband signals (step S614), and further checks the TxDis signal and the PD signal again after the status read interval ΔTs (step S615). Here, it is assumed that the TxDis signal and the PD signal checked the first time and the TxDis signal and the PD signal checked the second time are in the same states. In this case, the microcomputer 202 determines that the protocol chip 102 is not accessing the ROM 151, and issues the I2C acquisition command to the SFP module 101 via the I2C signal line 112 (step S616).

In response to receiving the I2C acquisition command, the SFP module 101 reads the SFP information from the ROM 151 and transmits the SFP information to the microcomputer 202 (step S617). In response to receiving the SFP information, the microcomputer 202 stores the SFP information in the microcomputer memory 203 (step S618).

Figure 7:
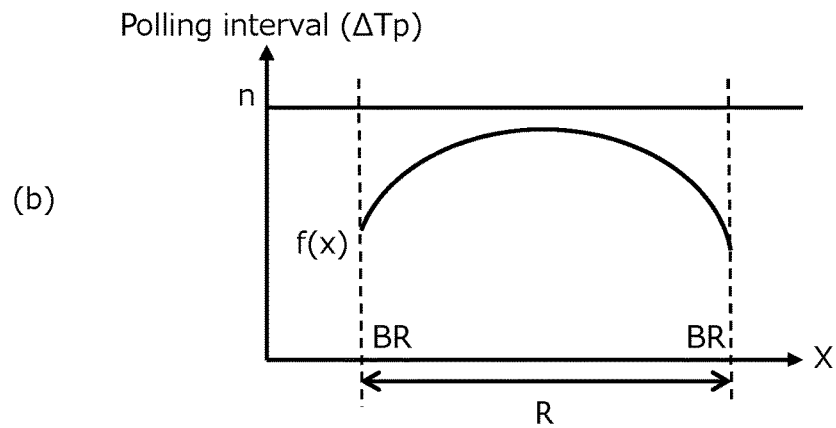
FIGS. 7(a) and 7(b) illustrate an example of a polling interval.

FIGS. 7(a) and 7(b) illustrate an example of the polling interval ΔTp.

When the microcomputer 202 acquires the SFP information (see steps S614 to S618), the microcomputer 202 determines the polling interval ΔTp based on the SFP information, and when the microcomputer 202 does not acquire the SFP information (see steps S611 to S613), the microcomputer 202 determines a predetermined fixed value as the polling interval ΔTp. Specifically, assuming that a variable (value) determined from predetermined condition information (e.g., temperature, and transmission and reception levels) in the SFP information is x, the microcomputer 202 determines, when acquiring the SFP information, the polling interval ΔTp according to a predetermined function f(x), and the microcomputer 202 determines, when not acquiring the SFP information, a fixed value n as the polling interval. Here, x is, for example, a weighted sum of the values of the condition information.

As illustrated in FIG. 7(b), the function f(x) becomes smaller as the variable x approaches a boundary value BR of an allowable range R, and the function f(x) becomes larger as the variable x departs from the boundary value BR of the allowable range R. In the present embodiment, when the variable x deviates from the allowable range R, the CPU 201 performs, for example, processing of closing the IF module 11 to stop the use of the SFP module 101. Therefore, the function f(x) whose value is for a variable x out of the allowable range R does not have to be defined. Note that the fixed value n is larger than the maximum value of the function f(x) in the example of FIGS. 7(a) and 7(b), but the fixed value n may be equal to or less than the maximum value of the function f(x).

Figure 8:
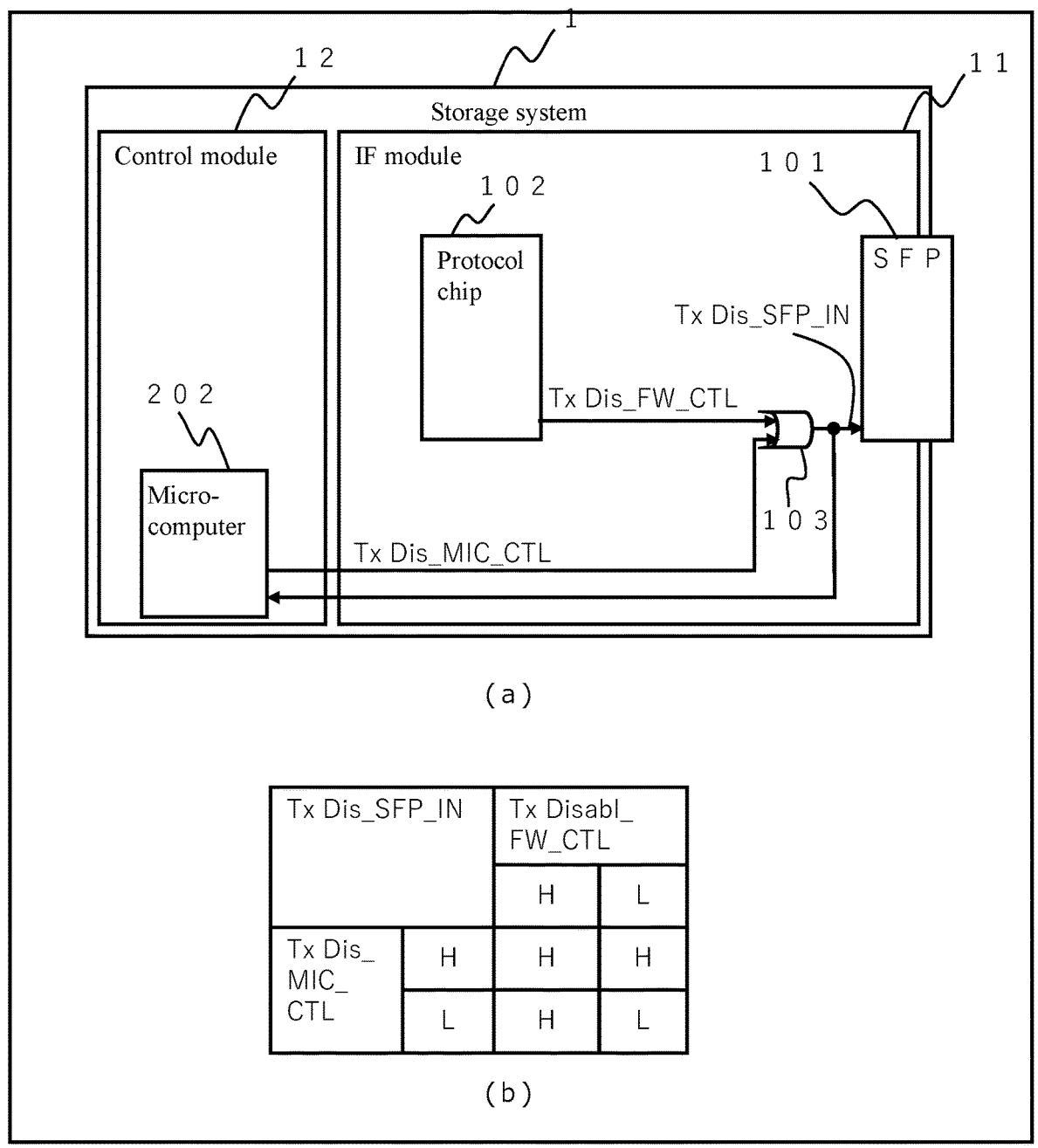
FIGS. 8(a) and 8(b) are diagrams for explaining optical output control with TxDis signals.

FIGS. 8(a) and 8(b) are diagrams for explaining optical output control with TxDis signals. FIG. 8(a) illustrates a main part related to the TxDis signal in the storage system 1 illustrated in FIG. 2. As illustrated in FIG. 8(a), there are types of TxDis signals: a first TxDis signal (Tx Dis_FW_CTL) output from the protocol chip 102 and a second TxDis signal (Tx Dis_MIC_CTL) output from the microcomputer 202, and a third TxDis signal (Tx Dis_SF- P_IN) obtained by the OR circuit 103 performing a logical operation on the two TxDis signals is input to the SFP module 101. The SFP module 101 switches the optical output on and off according to the third TxDis signal.

In the present embodiment, since the logical operation is a logical OR, as illustrated in FIG. 8(b), the third TxDis signal is a logic Low level only when both the first TxDis signal and the second TxDis signal are both a logic Low level, and otherwise, the third TxDis signal is a logic High level.

As described above, according to the present embodiment, the microcomputer 202 is coupled to the SFP module 101 via the control signal lines 112 to 114. The microcomputer 202 monitors the control signals transmitted on the control signal lines 112 to 114, and acquires, based on the result of monitoring, the condition of the SFP module 101 from the ROM 151 at a timing when the protocol chip 102 is not accessing the SFP module 101. Accordingly, the microcomputer 202 can avoid the collision of the control signals on the control signal lines while acquiring the condition information without going through the protocol chip 102. Therefore, it is possible to acquire the condition information of the SFP module 101, which is an optical transmitter and receiver, while suppressing the influence on the I/O function.

Further, the microcomputer 202 periodically executes check processing of checking the sideband signals of the control signals twice at the status read interval ΔTs, and when the states of the sideband signals are the same, the microcomputer 202 determines that the protocol chip 102 is not accessing the SFP module 101, and then acquires the condition information. Therefore, the collision of the control signals can be appropriately avoided.

Further, in the present embodiment, since the time at which the protocol chip 102 accesses the SFP module 101 differs depending on the type of the protocol chip, the microcomputer 202 sets the status read interval ΔTs depending on the type of the protocol chip. Therefore, the collision of the control signals can be avoided more appropriately.

Further, in the present embodiment, the microcomputer 202 determines the polling interval ΔTp after which the next check processing is executed, based on the acquired condition information. Accordingly, it is possible to perform processing suitable for the situation, for example in a way that when the condition of the SFP module 101 is good, the polling interval ΔTp is set to be longer to reduce the load of the microcomputer 202 and the risk of collision of the control signals of the microcomputer 202, and when the condition of the SFP module 101 is not good, the polling interval ΔTp is set to be shorter to frequently diagnose the SFP module.

Further, in the present embodiment, when the states of the control signals are different, the microcomputer 202 executes the next check processing at the predetermined polling interval ΔTp without acquiring the condition information.

Further, in the present embodiment, the microcomputer 202 outputs a second control signal independent of a first control signal that is a control signal transmitted by the protocol chip 102 to the SFP module 101, and controls the SFP module 101 by a logical operation of the first control signal and the second control signal. Therefore, it is possible to assert the control signal from the microcomputer 202 without going through the protocol chip 102.

The embodiment of the present disclosure described above is an example for the purpose of explaining the present disclosure, and the scope of the present disclosure is not intended to be limited only to that embodiment. A person having ordinary skill in the art can implement the present disclosure in various other aspects without departing from the scope of the present disclosure.

For example, the IF module 11 and the control module 12 may be provided in a apparatus or system other than the storage system 1.

What is claimed is:

1. A diagnostic module for diagnosing a communication module that includes an optical transmitter and receiver including a memory that stores condition information indicating a condition of the optical transmitter and receiver and configured to perform optical communication, and a protocol chip coupled to the optical transmitter and receiver via control signal lines to control the optical communication by the optical transmitter and receiver,
   the diagnostic module comprising a management unit coupled to the optical transmitter and receiver via the control signal lines,
   the management unit is configured to monitor control signals transmitted on the control signal lines, and acquire, based on a result of monitoring, the condition information from the memory of the optical transmitter and receiver at a timing when the protocol chip is not accessing the optical transmitter and receiver,
   wherein the management unit is configured to periodically execute check processing of checking sideband signals of the control signals twice at a predetermined time interval, and determine, when states of the sideband signals are the same, that the protocol chip is not accessing the optical transmitter and receiver to acquire the condition information.

2. The diagnostic module according to claim 1, wherein the management unit is configured to set the time interval depending on type of the protocol chip.

3. The diagnostic module according to claim 1, wherein the management unit is configured to determine a polling interval after which next check processing is executed, based on the acquired condition information.

4. The diagnostic module according to claim 3, wherein the management unit is configured to execute the next check processing at a predetermined polling interval without acquiring the condition information when states of the control signals are different.

5. A diagnostic module for diagnosing a communication module that includes an optical transmitter and receiver including a memory that stores condition information indicating a condition of the optical transmitter and receiver and configured to perform optical communication, and a protocol chip coupled to the optical transmitter and receiver via control signal lines to control the optical communication by the optical transmitter and receiver,
   the diagnostic module comprising a management unit coupled to the optical transmitter and receiver via the control signal lines,
   the management unit is configured to monitor control signals transmitted on the control signal lines, and acquire, based on a result of monitoring, the condition information from the memory of the optical transmitter and receiver at a timing when the protocol chip is not accessing the optical transmitter and receiver,
   wherein
      the control signals include switching signals for switching optical output of the optical transmitter and receiver on and off, and the management unit is configured to
output a second switching signal independent of a first switching signal that is a switching signal transmitted by the protocol chip to the optical transmitter and receiver, and
control the optical output of the optical transmitter and receiver by a logical operation of the first switching signal and the second switching signal.

6. The diagnostic module according to claim 5, wherein the optical transmitter and receiver is an SFP (Small Form-factor Pluggable) module configured to perform optical communication in accordance with SFP standard.

7. A monitoring method performed by a diagnostic module for diagnosing a communication module that includes an optical transmitter and receiver including a memory that stores condition information indicating an condition of the optical transmitter and receiver and configured to perform optical communication, and a protocol chip coupled to the optical transmitter and receiver via control signal lines to control the optical communication by the optical transmitter and receiver, the monitoring method comprising:
monitoring control signals transmitted on the control signal lines;
acquiring, based on a result of monitoring, the condition information from the memory of the optical transmitter and receiver at a timing when the protocol chip is not accessing the memory of the optical transmitter and receiver;
periodically executing check processing of checking sideband signals of the control signals twice at a predetermined time interval; and
determining, when states of the sideband signals are the same, that the protocol chip is not accessing the optical transmitter and receiver to acquire the condition information.

8. A non-temporary tangible computer-readable storage medium that stores a program causing a computer for diagnosing a communication module, the communication module including an optical transmitter and receiver including a memory that records condition information indicating an condition of the optical transmitter and receiver and configured to perform optical communication; and a protocol chip coupled to the optical transmitter and receiver via control signal lines to control the optical communication by the optical transmitter and receiver, the program causing the computer to:
monitor control signals transmitted on the control signal lines; and
acquire, based on a result of monitoring, the condition information from the memory of the optical transmitter and receiver at a timing when the protocol chip is not accessing the memory of the optical transmitter and receiver;
periodically execute check processing of checking sideband signals of the control signals twice at a predetermined time interval; and
determine, when states of the sideband signals are the same, that the protocol chip is not accessing the optical transmitter and receiver to acquire the condition information.

9. The non-temporary tangible computer-readable storage medium according to claim 8, wherein the program further causes the computer to set the time interval depending on type of the protocol chip.

10. The non-temporary tangible computer-readable storage medium according to claim 8, wherein the program further causes the computer to determine a polling interval after which next check processing is executed, based on the acquired condition information.

11. The non-temporary tangible computer-readable storage medium according to claim 10, wherein the program further causes the computer to execute the next check processing at a predetermined polling interval without acquiring the condition information when states of the control signals are different.

12. A non-temporary tangible computer-readable storage medium that stores a program causing a computer for diagnosing a communication module, the communication module including an optical transmitter and receiver including a memory that records condition information indicating an condition of the optical transmitter and receiver and configured to perform optical communication; and a protocol chip coupled to the optical transmitter and receiver via control signal lines to control the optical communication by the optical transmitter and receiver, the program causing the computer to:
monitor control signals transmitted on the control signal lines, wherein the control signals include switching signals for switching optical output of the optical transmitter and receiver on and off;
acquire, based on a result of monitoring, the condition information from the memory of the optical transmitter and receiver at a timing when the protocol chip is not accessing the memory of the optical transmitter and receiver;
output a second switching signal independent of a first switching signal that is a switching signal transmitted by the protocol chip to the optical transmitter and receiver; and
control the optical output of the optical transmitter and receiver by a logical operation of the first switching signal and the second switching signal.

13. The non-temporary tangible computer-readable storage medium according to claim 12, wherein the optical transmitter and receiver is an SFP (Small Form-factor Pluggable) module configured to perform optical communication in accordance with SFP standard.

14. The monitoring method according to claim 7, further comprising setting the time interval depending on type of the protocol chip.

15. The monitoring method according to claim 7, further comprising determining a polling interval after which next check processing is executed, based on the acquired condition information.

16. The monitoring method according to claim 15, further comprising executing the next check processing at a predetermined polling interval without acquiring the condition information when states of the control signals are different.

17. The monitoring method according to claim 7, wherein the optical transmitter and receiver is an SFP (Small Form-factor Pluggable) module configured to perform optical communication in accordance with SFP standard.

18. A monitoring method performed by a diagnostic module for diagnosing a communication module that includes an optical transmitter and receiver including a memory that stores condition information indicating an condition of the optical transmitter and receiver and configured to perform optical communication, and a protocol chip coupled to the optical transmitter and receiver via control signal lines to control the optical communication by the optical transmitter and receiver, the monitoring method comprising:
monitoring control signals transmitted on the control signal lines, wherein the control signals include switching signals for switching optical output of the optical transmitter and receiver on and off;

acquiring, based on a result of monitoring, the condition information from the memory of the optical transmitter and receiver at a timing when the protocol chip is not accessing the memory of the optical transmitter and receiver;

outputting a second switching signal independent of a first switching signal that is a switching signal transmitted by the protocol chip to the optical transmitter and receiver; and controlling the optical output of the optical transmitter and receiver by a logical operation of the first switching signal and the second switching signal.

19. The monitoring method according to claim 18, wherein the optical transmitter and receiver is an SFP (Small Form-factor Pluggable) module configured to perform optical communication in accordance with SFP standard.

20. The diagnostic module according to claim 1, wherein the optical transmitter and receiver is an SFP (Small Form-factor Pluggable) module configured to perform optical communication in accordance with SFP standard.

* * * * *